United States Patent [19]

Nakasugi

[11] Patent Number: 5,466,070
[45] Date of Patent: Nov. 14, 1995

[54] DYNAMIC FLUID BEARING ROTATING APPARATUS

[75] Inventor: Mikio Nakasugi, Chofu, Japan

[73] Assignee: Canon Kabushiki Kaisha, Tokyo, Japan

[21] Appl. No.: 425,249

[22] Filed: Apr. 17, 1995

Related U.S. Application Data

[63] Continuation of Ser. No. 135,431, Oct. 12, 1993, abandoned, which is a continuation of Ser. No. 691,424, Apr. 25, 1991, abandoned.

[30] Foreign Application Priority Data

Apr. 17, 1990 [JP] Japan ..................... 2-110359

[51] Int. Cl.⁶ ..................................... F16C 17/10
[52] U.S. Cl. ................ 384/112; 384/107; 384/292
[58] Field of Search ....................... 384/112, 292, 384/291, 297, 123, 107

[56] References Cited

U.S. PATENT DOCUMENTS

| | | | |
|---|---|---|---|
| 4,297,713 | 10/1981 | Ichikawa et al. | 346/108 |
| 4,323,317 | 4/1982 | Hasegawa | 400/118 |
| 4,875,263 | 10/1989 | Furumura | 384/297 |
| 4,883,367 | 11/1989 | Maruyama | 384/112 |
| 5,018,880 | 5/1991 | Nakasugi et al. | 384/112 |
| 5,076,716 | 12/1991 | Mizobuchi et al. | 384/123 |

FOREIGN PATENT DOCUMENTS

| | | |
|---|---|---|
| 2922452 | 12/1979 | Germany . |
| 3101793 | 8/1982 | Germany . |
| 3333368 | 3/1984 | Germany . |
| 2130836 | 6/1984 | United Kingdom . |

Primary Examiner—Lenard A. Footland
Attorney, Agent, or Firm—Fitzpatrick, Cella, Harper & Scinto

[57] ABSTRACT

A dynamic fluid bearing rotating apparatus comprises a shaft, a sleeve rotatably fitted to the shaft, a fixed member formed of a resin material, the fixed member being molded integrally with the sleeve, and a driver for rotating the shaft.

6 Claims, 3 Drawing Sheets

DYNAMIC FLUID BEARING ROTATING APPARATUS

This application is a continuation of application Ser. No. 08/135,431, filed Oct. 12, 1993, which is a continuation of application Ser. No. 07/691,424, filed Apr. 25, 1991, now both abandoned.

BACKGROUND AND SUMMARY OF THE INVENTION

This invention relates to a dynamic fluid bearing rotating apparatus, and particularly to a rotating apparatus for use in a deflection scanning apparatus used, for example, in a laser beam printer or the like.

In recent years, there has been an increasing demand for a rotating apparatus which effects high-speed rotation or highly accurate rotation, and particularly in a laser beam printer or the like, use is made of a dynamic fluid bearing which is rotated in non-contact to provide a highly accurate rotating apparatus. FIG. 1 of the accompanying drawings shows the deflection scanning rotating apparatus of a laser beam printer using a dynamic fluid bearing. A rotary shaft 1 and a sleeve 2 are rotatably fitted to each other, and a thrust plate 3, together with a fixed plate 4, is disposed on the lower end portion of the sleeve 2, and is fixed to an outer cylinder 5. A flange 6 is fixed to the rotary shaft 1, and a rotatable polygon mirror 7 for deflecting a light beam from a light source is fixed to the upper portion of the flange 6, and a yoke 9 having a driving magnet 8 fixed thereto is fixed to the lower portion of the flange 6. A stator 10 fixed to the outer cylinder 5 is disposed at a location opposed to the driving magnet 8. The thrust plate 3 is formed with a shallow groove 11 in the surface thereof opposed to the end portion of the rotary shaft 1, whereby there is formed a dynamic thrust bearing. Also, the outer peripheral surface of the rotary shaft 1 is formed with a herringbone-shaped shallow groove 14 at a location thereon opposed to the inner peripheral surface of the sleeve 2, whereby there is formed a dynamic fluid radial bearing. Further, a spirally shaped shallow groove 15, along which lubricating fluid flows to the dynamic thrust bearing, is formed near the opening portion of the sleeve. Also, a recess 16 and a small hole 17 are provided in the sleeve 2 at a location thereon between the herringbone-shaped shallow groove 14 and the spirally shaped shallow groove 15, thereby securing the stability of the dynamic bearings using liquid (oil, grease or the like) as lubricating fluid.

However, the above-described example of the prior art has suffered from the following disadvantages as a dynamic fluid bearing rotating apparatus:

(1) It has a number of parts and unless the accuracy of each part is made high, it cannot satisfy the characteristic as a rotating apparatus, and this leads to higher working and assembly costs.

(2) It is difficult to make it compact and light in weight as a rotating apparatus because the various parts are coupled together. Particularly where the parts are fastened together by means of screws or the like, the heads of the screws protrude.

The present invention has been made in view of the above-noted problems peculiar to the prior art, and intends to reduce the number of parts of a dynamic fluid bearing rotating apparatus and reduce the manufacturing cost thereof and also makes the apparatus compact and light in weight.

To achieve the above task, according to the present invention, there is provided a dynamic fluid bearing rotating apparatus which has a shaft and a sleeve fitted to each other for rotation relative to each other and in which a dynamic radial bearing is constructed between the outer peripheral surface of said shaft and the inner peripheral surface of said sleeve and one end portion of said shaft is received to thereby construct a dynamic thrust bearing, characterized in that of said sleeve and said shaft, the member on the fixed side is made integral with a fixed member formed of a resin material.

By the sleeve or the shaft being made integral with the fixed member formed of a resin material as described above, the number of parts can be reduced and the manufacturing cost can be reduced and also, the apparatus can be made compact and light in weight.

DETAILED DESCRIPTION OF THE PREFERRED EMBODIMENTS

Some embodiments of the present invention will hereinafter be described with reference to the drawings.

Figure 2:
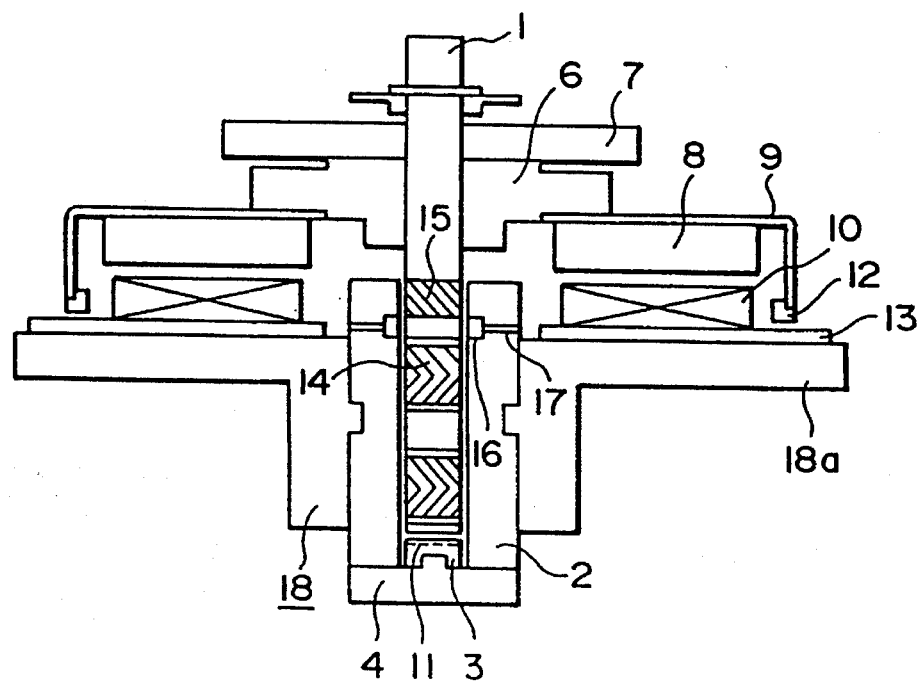
FIG. 2 is a cross-sectional view showing the construction of a dynamic fluid bearing rotating apparatus according to an embodiment of the present invention.

FIG. 2 shows the construction of a dynamic fluid bearing rotating apparatus according to an embodiment of the present invention. In FIG. 2, a rotary shaft 1 and a sleeve 2 are fitted to each other for rotation relative to each other. A flange 6 is fixed to the upper portion of the rotary shaft 1, and a rotatable polygon mirror 7 is fixed to the upper portion of the flange 6. A herringbone-shaped shallow groove 14 is formed in the rotary shaft 1 at a location thereon whereat the outer peripheral surface of the rotary shaft 1 and the inner peripheral surface of the sleeve 2 are opposed to each other, whereby there is formed a dynamic radial bearing. In the present embodiment, the herringbone-shaped shallow groove 14 is formed in the rotary shaft 1, but alternatively, it may be formed in the sleeve 2. In the rotating apparatus of FIG. 2, a spiral shallow groove 15 along which lubricating fluid flows to the dynamic thrust bearing side (the lower side as viewed in FIG. 2) is likewise formed near the opening portion (the upper portion) of the sleeve. A rotor 9 having fixed thereto a driving magnet 8 and an FG magnet (a magnet for detecting the rotational speed) 12 is fixed to the lower portion of the flange 6, and a stator coil 10 and a printed substrate 13 on which an FG pattern (a pattern for detecting the rotational speed) is printed are disposed at locations opposed to the driving magnet 8 and the FG magnet 12, respectively. The stator coil 10 is disposed on the printed substrate 13 and the electrical energization thereof is controlled by a Hall element, not shown, and a drive circuit and a control circuit formed on the printed substrate 13.

On the other hand, the sleeve 2 is insert-molded on and made integral with a fixed member 18 formed of a resin material and holding the sleeve 2. A thrust plate 3, together with a fixed plate 4, is disposed on the lower end portion of the sleeve 2. A shallow groove 11 is formed in that surface of the thrust plate 3 which is opposed to the end portion of the rotary shaft 1, whereby there is formed a dynamic thrust bearing. In the present embodiment, the shallow groove 11 is formed in the thrust plate 3, but alternatively, it may be formed in the end portion of the rotary shaft 1. The aforedescribed stator coil 10 and printed substrate 13 are disposed on the upper portion of the fixed member 18, whereby there is constituted a dynamic fluid bearing rotating apparatus as a whole.

Figure 1:
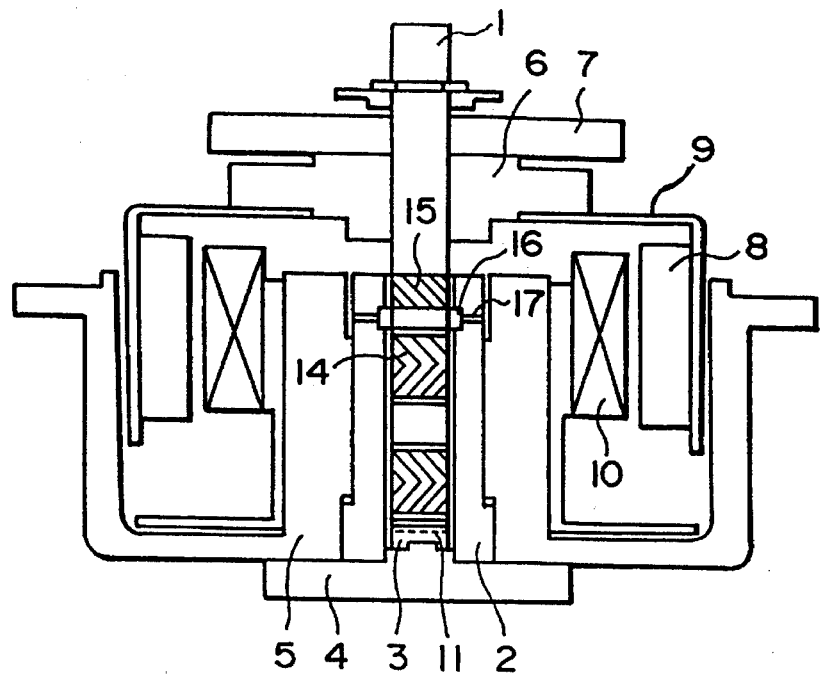
FIG. 1 is a cross-sectional view showing the construction of a dynamic fluid bearing rotating apparatus according to the prior art.

That is, in the dynamic fluid bearing rotating apparatus of FIG. 2, in contrast with that of FIG. 1, an outer cylinder 5 is made integral with the fixed member 18 formed of resin by insert-molding the sleeve 2, and the printed substrate 13 is disposed on the fixed member 18 formed of resin, and the stator coil 10 is disposed on the printed substrate 13.

Figure 3:
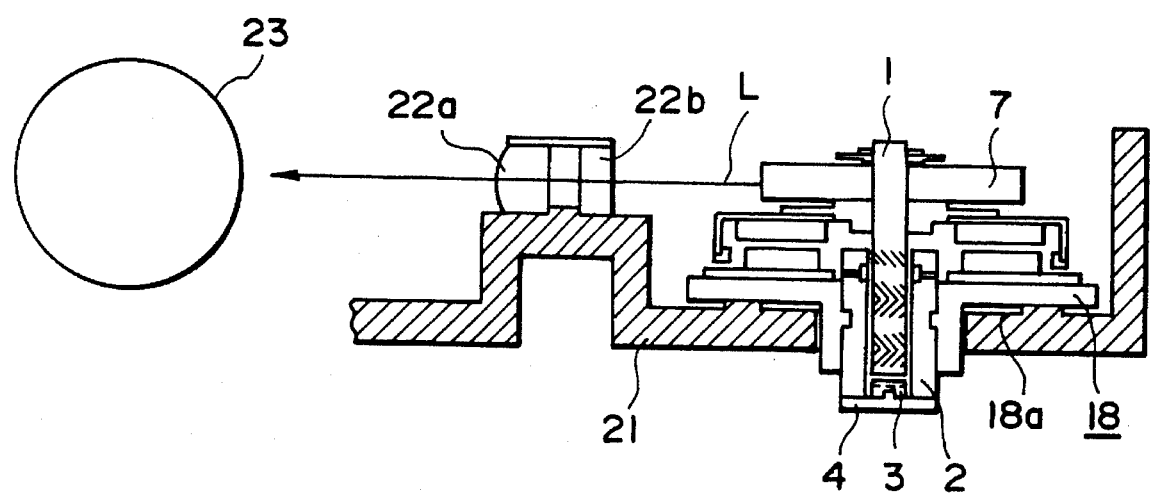
FIG. 3 shows an example of the dynamic fluid bearing rotating apparatus of the present invention as it is used in the polarized scanning apparatus of a laser beam printer.

An example of this dynamic fluid bearing rotating apparatus as it is used in the deflection scanning apparatus of a laser printer is shown in FIG. 3. Imaging lenses 22a and 22b are disposed in an optical box 21, and a (dynamic fluid bearing) rotating apparatus, constructed like that of FIG. 2 is mounted With the underside 18a of the fixed member 18 as a reference.

In the deflection scanning apparatus of FIG. 3, a laser beam L emitted from a light source (not shown) is deflected and scanned by the rotatable polygon mirror 7 on the rotating apparatus, and is imaged on the surface of a photosensitive drum 23 by the imaging lenses 22a and 22b. In this case, as the dynamic fluid bearing rotating apparatus, the accuracy of the fixed member 18 and of the sleeve 2 insert-molded on the fixed member 18 will be sufficient if it ensures the degree of perpendicularity of the underside 18a of the fixed member 18 to the inner peripheral surface of the sleeve 2. Accordingly, by a doping such a construction, the possibility of causing an incorporation error as in the prior art is eliminated and it becomes possible to reduce the number of parts such as screws and thus, the cost of the apparatus can be reduced.

By the rotation of the rotatable polygon mirror 7, the main scanning by the light beam is effected on the photosensitive drum 23, and by the photosensitive drum 23 being rotatively driven about the axis thereof, sub-scanning is effected. In this manner, an electrostatic latent image is formed on the surface of the photosensitive drum 23.

Around the photosensitive drum 23, there are disposed a corona discharger for uniformly charging the surface of the photosensitive drum, a developing device for visualizing the electrostatic latent image formed on the surface of the photosensitive drum 23 into a toner image, a transfer corona discharger for transferring the toner image to recording paper (all these being not shown), etc., and by the work of these devices, recording information corresponding to a light beam generated by a light source device is printed on the recording paper.

If the construction as described above is adapted, there will be provided a highly accurate rotating apparatus and therefore, there can be provided a scanning optical device for use in a highly accurate laser beam printer, a laser facsimile apparatus or the like.

Figure 4:
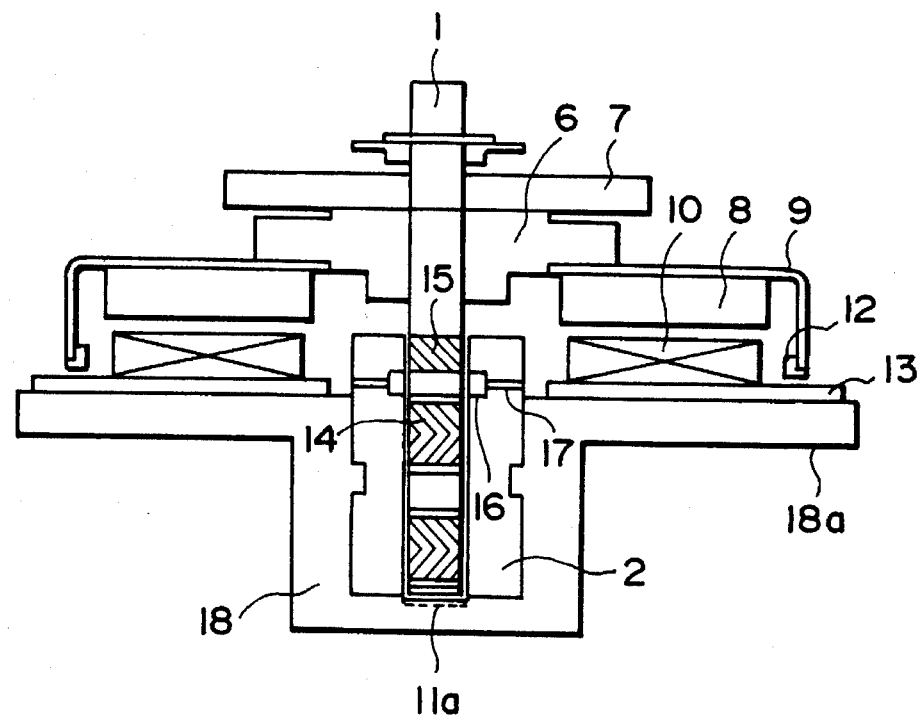
FIG. 4 is a cross-sectional view showing the construction of a dynamic fluid bearing rotating apparatus according to another embodiment of the present invention.

FIG. 4 shows another embodiment of the present invention. In the following embodiments, members functionally similar to those in FIG. 2 are given similar reference numerals and need not be described.

In FIG. 4, the sleeve 2 is insert-molded on and made integral with the fixed member 18 formed of a resin material. A surface opposed to the end portion of the rotary shaft 1 by the fixed member 18 is formed on the lower end portion of the sleeve 2 and further, a shallow groove 11a is formed in this surface during molding, whereby there is formed a dynamic thrust bearing. By adopting such a construction, the number of parts can be further reduced than in the embodiment of FIG. 2 and it becomes possible to eliminate any incorporation error. Also, the elimination of screws or the like leads to the compactness and light weight of the apparatus.

Figure 5:
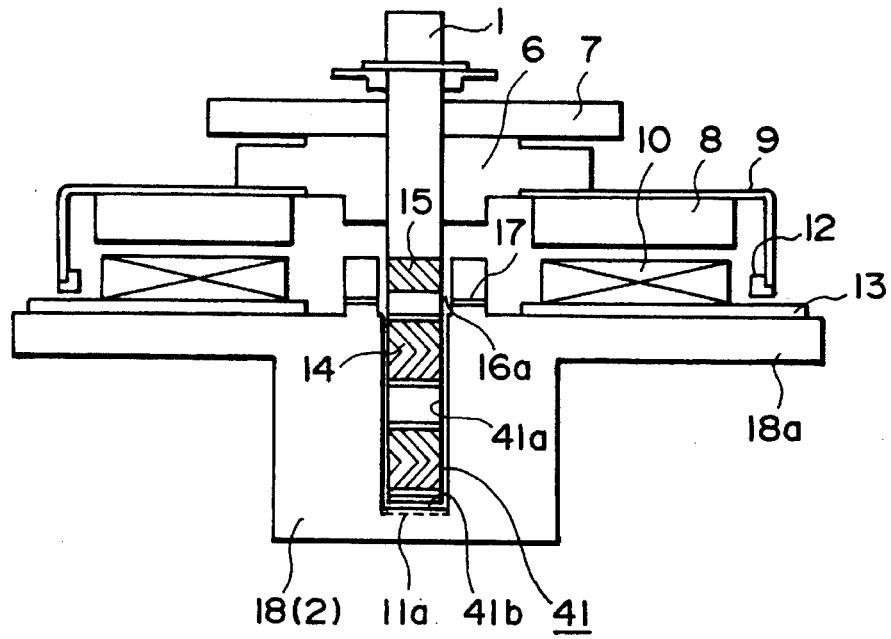
FIG. 5 is a cross-sectional view showing the construction of a dynamic fluid bearing rotating apparatus according to still another embodiment of the present invention.

FIG. 5 shows still another embodiment of the present invention. In the rotating apparatus of this figure, the fixed member 18 using a resin material and the sleeve 2 are molded integrally with each other, and a dynamic radial bearing is constituted by the inner peripheral surface 41a of a recess 41 in the fixed member 18 and the outer peripheral surface of the rotary shaft 1. The inner peripheral surface 41a of the fixed member 18 opposed to the spirally shaped shallow groove 15 on the rotary shaft 1 is made substantially equal in diameter to a recess 16a formed with a small-diametered aperture 17 so that a mold for molding the fixed member may readily slip out. Also, a shallow groove 11a is formed in the bottom surface 41b of the recess 41 so that a dynamic thrust bearing may be formed in opposed relationship with the end portion of the rotary shaft 1.

By adopting such a construction, the fixed member 18 and the sleeve 2 make one part and thus, it becomes possible to achieve a great reduction in cost and it becomes unnecessary to take the error by assembly into consideration because the accuracy of all parts is determined by one part.

It also becomes very easy to make the apparatus compact and light in weight.

If the accuracy of the inner peripheral surface of the recess in the molded fixed member 18 is insufficient as the dynamic radial bearing surface, the accuracy of that inner peripheral surface can also be maintained by post-working.

Further, the fixed member 18 with which the sleeve 2 is made integral will make two parts if the portion thereof formed with the shallow groove 11a in which a dynamic thrust bearing is formed is divided, but it will become easy to work and this may become advantageous in terms of cost. There is also the advantage that the materials can be suitably chosen.

Although the above embodiments have been described with respect to a case where the sleeve is molded integrally with the fixed member, a similar effect can be obtained even if the sleeve is a rotatable sleeve and the shaft is molded integrally with the fixed member.

Figure 6:
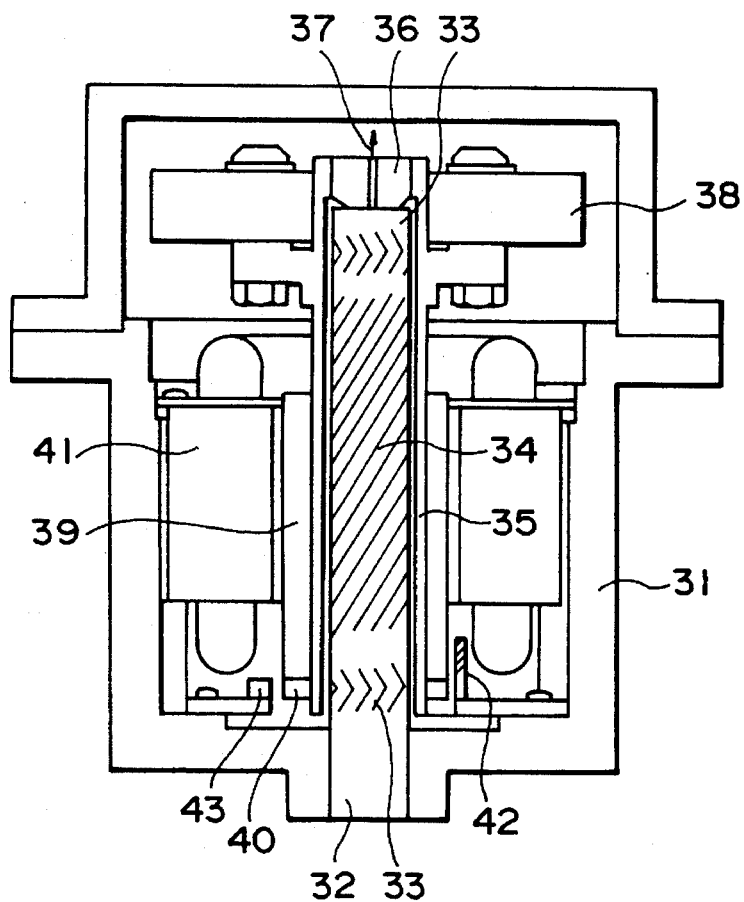
FIG. 6 is a cross-sectional view showing the construction of a dynamic fluid bearing rotating apparatus according to yet still another embodiment of the present invention.

An embodiment of the rotatable sleeve type dynamic fluid bearing rotating apparatus of the present invention will hereinafter be described in detail. FIG. 6 shows the construction of a polygon mirror driving peripherally opposed type motor of the rotatable sleeve type using a dynamic bearing utilizing air as a medium. A fixed shaft 32 molded integrally with an outer cylinder 31 which is a fixed member formed of a resin material is formed with a herringbone-shaped groove 33 and a spiral groove 34, and this fixed shaft 32 is also covered with a rotatable sleeve 35 so that the radial gap therebetween may be of the order of 3–10 μ.

A thrust pad 36 which comes into contact with the end of the shaft during the stoppage of the apparatus is forced into the upper end of the sleeve, and a restriction 37 for generating pressure in the thrust direction by the choke effect and causing the rotatable portion to float up to a predetermined level is formed at the center of the thrust pad 36.

A polygon mirror 38, a magnet 39 as a rotor and a balance ring 40 for keeping the balance of the rotatble member are mounted on the sleeve 35, and a stator coil 41, a Hall element 42 and a reflection type sensor 43 for reading the black-and-white pattern of the balance ring and providing a tack signal for PLL control (phase synchronizing control) are mounted on the outer cylinder in opposed relationship with the magnet 39 and together constitute a PLL control DC (direct current) Hall motor as a whole.

When an electric current flows to the stator coil 41, the sleeve 35 is rotated and air flows in through the aforementioned groove, and pressure by air film is produced in the radial and thrust directions by the spiral and herringbone-shaped grooves 33 and 34 and the upper restriction 37 and thus, the fixed shaft 32 and the sleeve 35 rotate without contacting with each other, and continue to rotate while being controlled to a predetermined number of rotations by the PLL control.

Here, the element important as the dynamic bearing in such a vertical type construction is the thrust pad 36.

The outer peripheral groove of the shaft and the inner surface of the sleeve are a radial bearing portion having rigidity in the radial direction, whereas the thrust pad 36 works as a thrust bearing portion having thrust rigidity with the aid of the gas pumping action by the restriction 37 and the spiral groove 34.

As described above, the present invention is a dynamic fluid bearing rotating apparatus which has a shaft and a sleeve fitted to each other for rotation relative to each other and in which a dynamic radial bearing is constructed between the outer peripheral surface of said shaft and the inner peripheral surface of said sleeve and one end portion of said shaft is received to constitute a dynamic thrust bearing and wherein of said sleeve and said shaft, the fixed side member is made integral with a fixed member formed of a resin material.

Further, if in a rotary shaft type dynamic fluid bearing rotating apparatus, there is adopted a construction in which said sleeve is molded integrally with said fixed member and at the same time, a shallow groove for a dynamic thrust bearing is formed in the bottom of said sleeve, the number of parts can be further reduced.

As described above, according to the present invention, the sleeve or the shaft is molded integrally with the fixed member formed of a resin material, whereby the number of parts and the manufacturing cost can be reduced and the apparatus can be made compact and light in weight.

What is claimed is:

1. A dynamic fluid bearing rotating apparatus comprising:

a shaft;

a fixed member formed of a resin material;

a sleeve rotatably fitted to said shaft, said sleeve having been insert-molded integrally with said fixed member;

driving means for rotating said shaft, with a part of said driving means being mounted on said fixed member; and a shallow groove for dynamic thrust bearing provided in a surface of said fixed member opposite to an end portion of said shaft, said shallow groove being formed in said fixed member upon the insert-molding of said sleeve.

2. An apparatus according to claim 1, wherein said part of said driving means is a printed substrate.

3. An apparatus according to claim 2, wherein said printed substrate has a printed FG pattern for detecting rotational speed.

4. An apparatus according to claim 1, wherein an inner peripheral surface of said sleeve and an outer peripheral surface of said shaft form a dynamic radial bearing.

5. An apparatus according to claim 1, wherein said dynamic fluid bearing rotating apparatus is employed in a deflecting scanning apparatus, with said deflecting scanning apparatus including light deflector mounted on said shaft.

6. An apparatus according to claim 5, wherein said deflecting scanning apparatus is employed in a laser printer, and a light beam deflected by said light detector is scanned on a photosensitive member of said laser printer.

* * * * *

UNITED STATES PATENT AND TRADEMARK OFFICE
CERTIFICATE OF CORRECTION

PATENT NO. : 5,466,070
DATED : November 14, 1995
INVENTOR(S) : Nakasugi

It is certified that error appears in the above-indentified patent and that said Letters Patent is hereby corrected as shown below: TITLE PAGE:

[30] FOREIGN APPLICATION PRIORITY DATA:

"Apr. 17, 1990  [JP]  Japan ......... 2-110359" should read
--Apr. 27, 1990  [JP]  Japan .......... 2-110359--.

COLUMN 1:

Line 6, "No. 07,691,424," should read --No. 07/691,424,--.

COLUMN 3:

Line 41, "a doping" should read --adopting--.

COLUMN 6:

Line 37, "light" should read --a light--.

Signed and Sealed this

Eleventh Day of June, 1996

Attest:

BRUCE LEHMAN

*Attesting Officer*    *Commissioner of Patents and Trademarks*